Feb. 15, 1955  A. D. JOHNSTON  2,702,044
AUTOMATIC SUPPLY AND EXHAUST VALVE
Filed Nov. 23, 1953
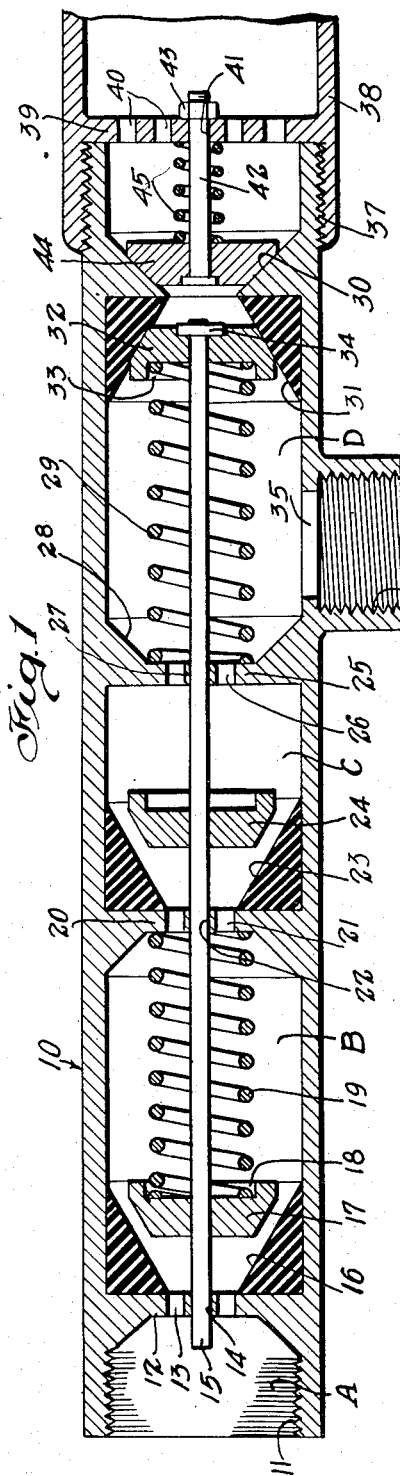
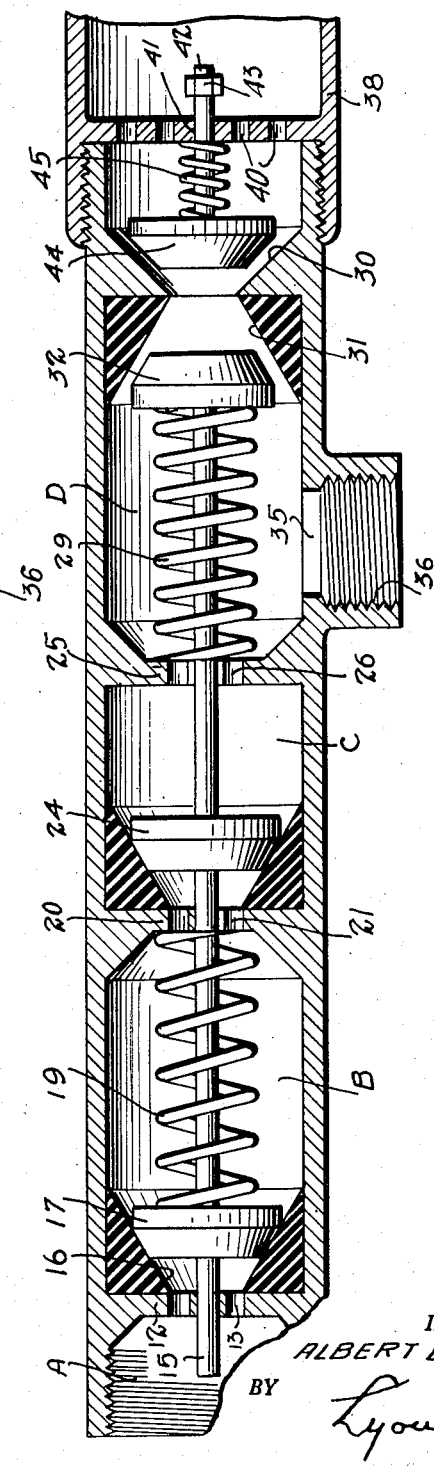
INVENTOR.
ALBERT D. JOHNSTON
BY
*Lyon & Lyon*
ATTORNEYS

2,702,044

AUTOMATIC SUPPLY AND EXHAUST VALVE

Albert D. Johnston, South Gate, Calif.

Application November 23, 1953, Serial No. 393,767

3 Claims. (Cl. 137—102)

This invention relates to a check valve and more particularly to a device of the nature of a trap designed to be interposed in air or gas pressure conduits and to act as a trap to prevent leakage therefrom.

It is a primary object of this invention to provide an apparatus of the type described for use in air or gas pressure lines to prevent leakage when the actuating pressure is released.

It is another object of this invention to provide a device of the type described which is simple, durable and economical of manufacture.

It is another object of the present invention to provide a device of the type described in which air or gas under pressure is entrapped through the force of its own pressure and acts as a seal to prevent further leakage from the system.

These and other objects and advantages of the invention will be apparent from the annexed specification in which:

Figure is a cross section of a check valve embodying the present invention showing the device in one position.

Figure 2 is a view similar to Figure 1 showing the device in another position.

Referring now more particularly to the drawings, the invention is illustrated as comprising generally a cylindrical tube 10 provided with an internally threaded portion 11 at one end, a wall 12 having a plurality of passages 13 and a central bore 14, through which extends the end of a shaft 15. A tapered valve seat 16, preferably of rubber or rubber-like composition, is provided on the wall 12 as illustrated, and the shaft 15 has affixed thereto a valve 17 having walls tapered to mate with the valve seat 16 and having a recessed portion 18 adapted to receive the end of a coil spring 19 mounted about the shaft 15 as shown. The tube 10 is provided with a second internal wall 20, against the end of which the other end of the coil spring 19 bears. It will thus be apparent that the coil spring 19 constantly biases the valve 17 towards engagement with the valve seat 16. The wall 20 is provided with a plurality of passages 21 and a central opening 22 through which extends the shaft 15. The wall 20 is likewise provided with a tapered valve seat 23 similar to the valve seat 16, and a valve 24, which may be interchangeable with the valve 17, is affixed to the shaft 15 as shown.

The tube 10 is provided with another internal wall 25 provided with a plurality of apertures 26 and a central bore 27 through which the shaft 15 extends. The wall 25 is provided with a tapered section 28 providing a seat for a coil spring 29 mounted about the shaft 15. The tube 10 is provided with a tapered wall 30, and a tapered valve seat 31 is formed thereon, preferably of rubber or rubber-like composition, and the shaft 15 carries a valve 32 tapered to mate with the valve seat 31 and having a recessed portion 33 in which seats the other end of the coil spring 29. The valve 32 may be retained on the shaft 15 by a nut or washer 34. An opening 35 is provided in the tube 10, and a threaded fitting 36 is affixed thereto.

The open end of the tube 10 is threaded as at 37 to receive an internally threaded member 38 having an internal wall 39 provided with a plurality of openings 40 and a central bore 41 adapted to receive a shaft 42 threaded at its end to receive a nut 43. The shaft 42 has affixed thereto a tapered valve 44 adapted to mate with the tapered wall 30, and a coil spring 45 is mounted upon the shaft 42 with one end bearing upon the valve 44 and the other end bearing upon the wall 39 as illustrated.

The operation of the above-described device is as follows: the fitting 36 is attached to a conduit leading to a device to be actuated such as the air brakes of a truck or vehicle, and air under pressure is supplied to the tube 10 in the zone indicated by the letter A. This air pressure will cause the valve 17 to unseat from the valve seat 16 and to enter zone B. As the valve 24 is affixed to the shaft 15, the valve 24 simultaneously unseats from the valve seat 23 permitting air under pressure to enter zone C from which it passes by means of the passages 26 into zone D. As the valve 32 is affixed to the shaft 15, it will simultaneously seat upon the valve seat 31 and the air under pressure is passed through the fitting 36 to the mechanism to be actuated.

When it is desired to deactuate the mechanism, the pressure supplied to zone A is decreased. As the pressure thus supplied is decreased, the valve 17 is forced under the bias of the spring 19 to seat upon the seat 16, and valve 24 simultaneously seats upon the seat 23 thus entrapping air under pressure in the zone B. Further reduction of pressure in zone A will nevertheless fail to decrease pressure in zone B as the same is sealed not only by the force of the spring 19 but by the higher pressure remaining in zone B. As the valves 17 and 24 and shaft 15 thus move to the left (Figure 1), valve 32 unseats from valve seat 31, as illustrated in Figure 2. However, air or gas under pressure in zone D does not immediately escape, as it is first necessary to overcome the force of the spring 45 and unseat the valve 44 from the valve seat 30. This leaves a short time lag which assures that the valves 17 and 24 will be seated prior to exhausting air or gas under pressure from zone D, the fitting 36 or the attached mechanism.

When the device is in the sealed condition shown in Figure 2, zone B is, as above-described, at a higher pressure than either zone A or zone D and operates as an air seal preventing any leakage of air or gas under pressure from zone A.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

I claim:

1. A device of the type described comprising: a tubular body having an inlet and an outlet; a pair of walls in said body defining a compartment; said walls being provided with passages; valve seats on each of said walls associated respectively with said passages; a valve stem extending through each of said passages; a pair of valves on said valve stem, one associated with each of said seats; a coil spring on said stem engaging one of said valves and one of said walls and constantly biasing said valve stem toward position in which each of said valves is seated on its respective seat; said inlet being on one side and said outlet on the other side of said pair of walls; whereby gas under pressure in said compartment is entrapped in said compartment when pressure applied to the other side of said one of said valves is overcome by said spring; a third wall in said body intermediate said compartment and said outlet; a fourth wall in said body beyond said outlet; said third and fourth walls being provided with passages; said valve stem extending through said last named passages; a valve seat on said fourth wall; a third valve on said stem associated with said last named valve seat; and said third valve being arranged to seat when said first valves unseat and to unseat when they seat.

2. A device of the type described comprising: a tubular body having an inlet and an outlet; a pair of walls in said body defining a compartment; said walls being provided with passages; valve seats on each of said walls associated respectively with said passages; a valve stem extending through each of said passages; a pair of valves on said valve stem, one associated with each of said seats; a coil spring on said stem engaging one of said valves and one of said walls and constantly biasing said valve stem toward position in which each of said valves is seated on its respective seat; said inlet being on one side and said outlet on the other side of said pair of walls; whereby gas under pressure in said compartment is entrapped in said compartment when pressure applied to the other side of said one of said valves is overcome by said spring; a third wall in said body intermediate said compartment and said outlet; a fourth wall in said body beyond said outlet; said third and fourth walls being provided with passages; said valve stem extending through said last named passages; a valve seat on said fourth wall; a third valve on said stem associated with said last named valve seat; said third valve being arranged to seat when said first valves unseat and to unseat when they seat; and a coil spring on said stem with one end engaging said third wall and the other end engaging said third valve and constantly biasing said stem toward position to seat said third valve.

3. A device of the type described comprising: a tubular body having an inlet and an outlet; a pair of walls in said body defining a compartment; said walls being provided with passages; valve seats on each of said walls associated respectively with said passages; a valve stem extending through each of said passages; a pair of valves on said valve stem, one associated with each of said seats; a coil spring on said stem engaging one of valves and one of said walls and constantly biasing said valve stem toward position in which each of said valves is seated on its respective seat; said inlet being on one side and said outlet on the other side of said pair of walls; whereby gas under pressure in said compartment is entrapped in said compartment when pressure applied to the other side of said one of said valves is overcome by said spring; a third wall in said body intermediate said compartment and said outlet; a fourth wall in said body beyond said outlet; said third and fourth walls being provided with passages; said valve stem extending through said last named passages; a valve seat on said fourth wall; a third valve on said stem associated with said last named valve seat; said third valve being arranged to seat when said first valves unseat and to unseat when they seat; a coil spring on said stem with one end engaging said third wall and the other end engaging said third valve and constantly biasing said stem toward position to seat said third valve; and said fourth wall being provided with a second valve seat; a fourth valve and spring means biasing said fourth valve toward said last named seat.

References Cited in the file of this patent
UNITED STATES PATENTS

| 879,604 | Wawrzinski | Feb. 18, 1908 |
| 1,245,873 | Cole | Nov. 6, 1917 |
| 1,791,449 | Kennedy | Feb. 3, 1931 |